Jan. 8, 1957 W. A. REED ET AL 2,776,874
REACTOR FOR THE HIGH TEMPERATURE REDUCTION OF
IRON OXIDE AND THE LIKE
Filed June 25, 1954 3 Sheets-Sheet 1

INVENTORS
WILLIAM A. REED
HARRY RICHARD HATCHER
JACK R. SANSCRAINTE
BY Robert E. Dunham
ATTORNEY

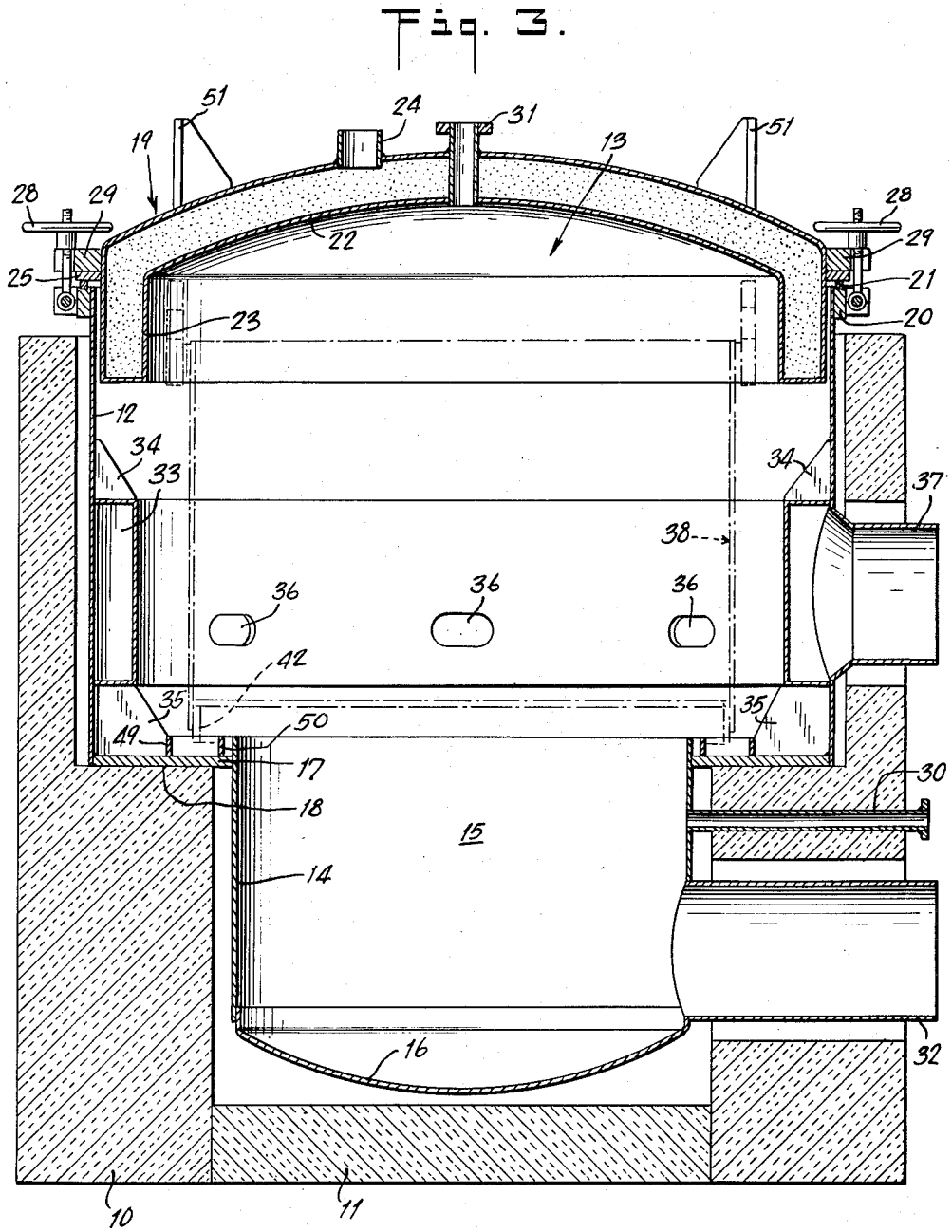

Jan. 8, 1957 W. A. REED ET AL 2,776,874
REACTOR FOR THE HIGH TEMPERATURE REDUCTION OF
IRON OXIDE AND THE LIKE
Filed June 25, 1954 3 Sheets-Sheet 3
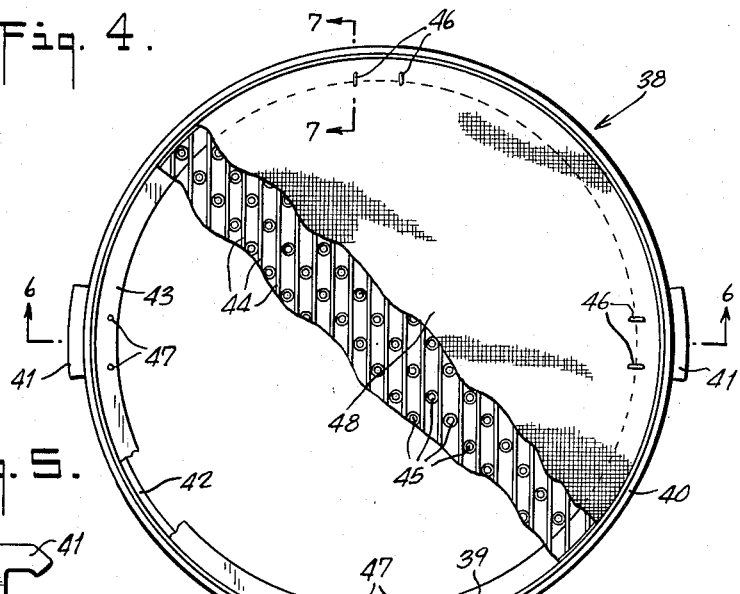
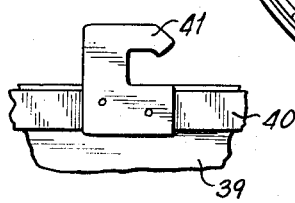
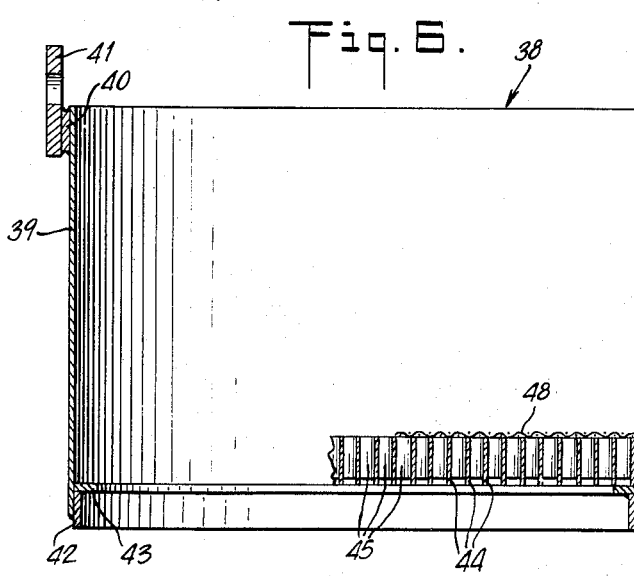
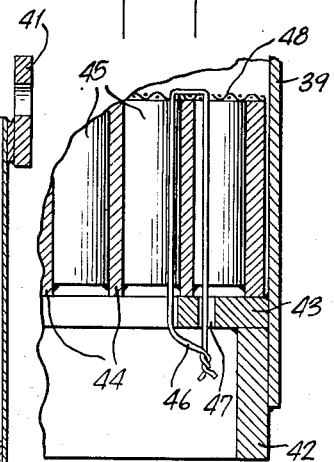
INVENTORS
WILLIAM A. REED
HARRY RICHARD HATCHER
JACK R. SANSCRAINTE
BY Robert S. Dunham
ATTORNEY

United States Patent Office 2,776,874
Patented Jan. 8, 1957

2,776,874

REACTOR FOR THE HIGH TEMPERATURE REDUCTION OF IRON OXIDE AND THE LIKE

William A. Reed, West Richfield, Harry R. Hatcher, Maple Heights, and Jack R. Sauscrainte, Cleveland, Ohio, assignors to Republic Steel Corporation, Cleveland, Ohio, a corporation of New Jersey Application June 25, 1954, Serial No. 439,191

3 Claims. (Cl. 23—284)

The present invention relates to a reactor for the high temperature reduction of iron oxide and the like and more particularly to a reactor apparatus in which iron oxide or a mixture of the oxides of iron may be reduced by reaction with a gas containing hydrogen and/or other gaseous reducing agents and possibly also containing some hydrogen halide which facilitates the reduction reaction and gives a desired type product. The present invention does not concern itself with the reaction per se considered as a process. One such process which may be carried on using apparatus in accordance with the present invention is set forth in the copending application of Crowley, Serial No. 375,927, filed August 24, 1953, now Patent No. 2,744,002, and entitled "Process of Making Powdered Iron in a Discrete Crystalline Form." The present invention, however, is not limited to this particular process being carried on therein, but is applicable to use in carrying on other more or less similar gas-to-solid type chemical reactions.

A general object of the present invention is to provide an apparatus wherein a relatively high temperature gas-to-solid chemical reaction, such as the reduction of iron oxide and the like, may be carried on on a batch basis and efficiently from the point of view of commercial operation.

The device of the present invention may be summarized as comprising a means, refractory in nature, providing bottom and side walls for a pair of chambers including an upper reaction chamber and a plenum chamber below and contiguous therewith. More particularly, the bottom and side wall providing means comprises an inner metallic shell, which may be made of any metal capable of withstanding the temperatures and any particular chemical conditions to which it may be exposed and which is surrounded by one or more layers of non-metallic and usually ceramic type refractory material and possibly also with an outer layer of heat-insulating material which will also be non-metallic in nature. The upper end portion of the device is adapted to be closed by a removable top member, which is also preferably of metallic construction, for example, built as a hollow shell of metal and filled with suitable non-metallic heat-insulating material. Suitable means are provided for securing the top member in a gas-tight manner to the metallic shell forming the reaction and plenum chambers as aforesaid. The whole device is adapted to contain a removable container for the solid material to be treated. This container is inserted into the reaction chamber; and when in place therein, serves to confine the solid material to be treated and to direct the flow of gases from the plenum chamber upwardly through the gas-pervious bottom of the container, thence through the solid material to be reacted, thence over and downwardly around the outside of the container to an exhaust manifold. This manifold is preferably disposed around the reaction chamber at a level lower than the upper end of the container, when the latter is in place in this chamber. Suitable means are also provided for supplying gases to the plenum chamber and for exhausting gases from the manifold aforesaid. Other means, more or less conventional in nature, may be provided as desired for introducing thermocouples or other temperature-sensing means into the reactor, so as to indicate and/or record the temperatures, or to operate temperature controlling means as may be desired. Provision may further be made for visual observation of the material within the reaction chamber by use of sight openings suitably disposed in the apparatus. Other details of the construction and the purposes thereof will appear hereinafter as the description of a preferred embodiment of the invention proceeds.

Apparatus in accordance with the present invention may be used from time to time in the carrying out of processes which are (a) exothermic, and (b) endothermic, or some combination of both, in which sequential operations may be one and then the other of these two conditions. When any process of one of these types is used, the provisions of the present invention, by which the gases from the reaction chamber are required to pass downwardly in the annular space between the container for the solid material and the side walls of the chamber, result in a stabilizing of the temperature conditions throughout the charge. This is so irrespective of whether the operation taking place is exothermic or endothermic or both in some sequence.

The same provisions of requiring the exhaust gases to pass downwardly in the annular space are also highly useful in processes which may from time to time involve a purging of one gaseous atmosphere by another. By reason of the provisions hereinabove summarized and hereinafter particularly disclosed, there are no dead spaces or pockets in which one type of gaseous atmosphere may be trapped when a purging operation is carried on and which could conceivably cause some malfunctioning, for example, explosions in the event that an oxygen-containing gas were trapped and not purged prior to the passage through the device of a reducing gas, for example, one containing hydrogen.

The invention will be better understood by reference to the accompanying drawings, in which:

Figure 1 is a plan view with a portion broken away and in horizontal section showing a device constructed in accordance with the present invention;

Fig. 2 is a fragmentary view principally in elevation and with a part broken away and in vertical section of the upper portion of the device of Fig. 1;

Fig. 3 is a view substantially in central vertical section on the line 3—3 of Fig. 1;

Fig. 4 is a plan view with parts broken away of a container for solid material to be treated in the apparatus shown in the previous figures;

Fig. 5 is a fragmentary detailed view showing one of the hooks by which the container of Fig. 4 may be lifted up and carried from place to place;

Fig. 6 is a view substantially in central vertical section on the line 6—6 of Fig. 4, but with parts broken away, showing the structure of the container and particularly the bottom portion thereof; and Fig. 7 is a fragmentary view of a portion of the device of Fig. 6 showing the manner in which the bottom portion of the container is held in assembled relation, the view being on a scale substantially enlarged with respect to the scale of Fig. 6.

Considering now the details of a preferred embodiment of the present invention and referring particularly to Figs. 1 to 3, inclusive, of the accompanying drawings, the reactor of the present invention comprises a refractory means providing bottom and side walls forming a central reaction chamber and a contiguous plenum chamber arranged below the reaction chamber. This means includes side wall forming portions 10 and a bottom wall forming portion 11, both of suitable refractory material, preferably of ceramic nature such as fire brick. In accordance with the preferred embodiment of the present invention, there is constructed within this ceramic structure a metallic shell including a substantially cylindrical member 12 lining the substantially cylindrical upper portion of the structure previously described and providing therein a reaction chamber generally indicated at 13. A similar substantially cylindrical shell member 14 is located below the member 12 and is of substantially lesser diameter, the member 14 defining a plenum chamber 15. The lower end of the plenum chamber 15 is formed by a metallic shell member 16 suitably secured, as by welding, to the lower edge portion of the member 14. The members 12 and 14 are connected by an annular plate-like member 17 preferably formed in a single plane and welded as indicated on the drawings to the members 12 and 14. The member 17 is arranged to seat, as shown, upon a ledge 18 formed by a portion of the side wall forming portions 10 incident to the difference in diameter between the reaction chamber 13 and the plenum chamber 15, it being noted that these chambers are both substantially cylindrical in shape and are contiguous and coaxial about a central vertical axis (not shown).

The upper portion of the reaction chamber 13 is adapted to be closed by a top member generally indicated at 19. In order that a gas-tight joint may be had between the member 12 and the top member 19, the upper edge portion of the member 12 is reinforced by a ringe 20 of suitable metal, which is secured thereto in any desired way, as by welding, and which carries a suitable annular gasket 21 of asbestos or other appropriate gasket-forming material.

The top member 19 is preferably constructed as a hollow metallic shell as shown best in Fig. 3 and comprises an arched central portion 22 and an annular, downwardly extending flange portion 23. These portions may be filled with any suitable heat insulating material, preferably of a non-metallic nature, such as nodulized asbestos or diatomaceous earth. The top member 19 may be provided with one or more openings as indicated at 24 through which the heat insulating filling material may be inserted or, if desired, removed. Following the filling of the top member, the openings 24 are closed in any suitable manner (not shown).

Surrounding the portion 22 of the top member and suitably secured thereto, as by welding, is an annular ring 25, which is arranged to seat against the gasket 21 as shown. For positioning the top member 19 accurately and uniformly on the shell 12 forming the reaction chamber, and assuring that it will always be positioned in the same oriented relation so as to assure a tight fit, the top member 19 may be provided with one or more positioning lugs 26, Figs. 1 and 2, which are arranged to be located exactly by pairs of cooperating lug members 27 carried by the ring 20.

Various arrangements may be used for securing the top member 19 to the metallic portion of the means providing the reaction chamber, in this case the member 12 and its ring 20. As shown, the ring 20 is provided with a plurality of conventional swing bolt means, each of which is provided with a threaded nut carried by a hand wheel 28. Each swing bolt and its threaded nut cooperates with a bifurcated lug 29 in a manner which is now well known in the art.

One or more thermocouple openings, wells or tubes may be provided as shown, for example, at 30 extending through the side wall forming means as indicated in Fig. 3. Alternatively, or in addition as desired, one or more openings, such as generally indicated at 31, may be provided in the top, these openings being for the purpose of permitting the introduction of a thermocouple or other temperature sensing means therethrough, or for permitting visual observation of the contents of the reaction chamber, or both. In any event, during the operation, it is customary that all openings into the reaction chamber shall be sealed against flow of gases either into or out of the reaction chamber and/or the plenum chamber, except as particularly hereinafter noted.

For supplying gases to the plenum chamber in accordance with the present invention, there is provided a duct 32 leading from any suitable source of hot gases of an appropriate gaseous composition. Inasmuch as neither the source nor the composition of the gases are particularly pertinent per se to the present invention, this other structure has not been shown, nor will it nor the gaseous composition be further set forth herein. It is noted, however, that the duct 32 is suitably secured, for example by welding, into an opening in the member 14 and serves as the sole inlet port for gases to the plenum chamber 15. It is contemplated that more than one such port could be provided if desired, one being shown in the accompanying drawings merely by way of example and not by way of limitation.

For removing gases from the reaction chamber 13, there is provided an annular exhaust manifold 33, which may be formed of sheet or cast metal as shown and which is preferably suitably rigidly secured within the annular wall member 12 and may in part be formed of that wall member. As shown, there is further provided a plurality of radial webs 34 and 35 for reinforcing the parts and assuring durability in use as well as for the prevention of damage to the manifold 33 due to inadvertent errors in placing containers of material to be treated into the reaction chamber and in removing such containers therefrom. It is noted that the inner edges of the webs 34 and 35 are sloped downwardly and inwardly, tending to guide a container being lowered into the reaction chamber to a central position therein. The annular manifold 33 is provided with a plurality of inwardly directed openings 36 spaced around the reaction chamber in a substantially uniform manner. The exhaust manifold 33 communicates with an outlet duct 37 extending through the upper portion of the wall forming portion 10 for conducting gases from the reactor to a suitable point or points where such gases may be suitably treated, and to the extent desired, then returned or recycled through the reactor of the present invention along with such other make-up gases as may be desired in admixture therewith.

Turning now to Figs. 4 to 7, inclusive, there is illustrated therein a preferred type of container for solid material to be treated in the reactor of the present invention. From a broad point of view, the container comprises a means by which solid material may be supported and moved from place to place and one having gas-impervious sides and a gas-pervious bottom.

As shown, the container, generally indicated at 38, Figs. 4-6 (the container being shown in broken lines in Fig. 3), comprises a cylindrical metallic wall 39, which may be formed of a stainless steel sheet, provided with a stiffening ring 40 adjacent to its upper edge and further provided with a pair of hook members 41 secured to the ring 40 and by which the container and its contents may be lifted by a suitable crane or other lifting means and carried from place to place. At its lower edge the wall 39 is suitably secured as by welding to an annular stiffening ring 42, to which may also be secured an annular flange member 43 as shown in Figs. 6 and 7. These parts may be fastened together in any suitable way, for example by welding.

Supported on and preferably removably secured to the annular member 43 is a gas-pervious bottom structure of a type which has sufficient strength to support the solid material which is intended to be received within the container 38 and yet which will offer a minimum of resistance to flow of gases upwardly through the bottom and thence through the solid material to be treated. While various constructions could be used for this purpose, there is shown a structure comprising a plurality of strips 44, each made of sheet metal of a desired thickness and arranged on edge and parallel to each other as a grid. These strips 44 are connected together by members 45 each formed as a pipe section having a length equal substantially to the width of the strips 44 and arranged with their axes vertical as shown in Figs. 4, 7 and 8 and welded or otherwise suitably connected to the strips 44. This structure is quite rigid in practice and as shown may be made with an outside contour so as to conform to the inner configuration of the container 38, so that it may be bodily placed in and removed from the container as a unit. For holding this bottom member constructed as aforesaid in place, there is shown a plurality of tie wires 46, Figs. 4 and 7, each passing around one of the strips 44 and passing through an aperture 47 in the annular member 43. Any suitable number of tie wires as shown may be used, this being but one way to secure the desired result, which is to hold the bottom of the container 38 in place, while permitting it to be easily removed as desired.

In view of the fact that some of the solid material which may be contained within the container 38 may be of a particle size so small as to penetrate into or pass through the gas-pervious bottom constructed as aforesaid, it is usually desirable to place above this bottom a screen 48 having a mesh size sufficiently small so as substantially to prevent passage of the solid material contents of the container 38 therethrough. It is, however, desirable that the mesh of this screen be as large as possible in view of the requirements therefor above stated, so as to introduce a minimum resistance to gas flow through the container incident to the screen 48 per se.

Having now described the construction in some detail, the operation thereof should be more or less obvious. However, it will be stated so that the present description shall be complete.

Starting with the reactor empty and the cover 19 in some removed position, the basket or container 38 is first filled with material to be treated in the reactor, this filling operation taking place at any suitable point. It is noted that due to the separate construction of the container 38, a plurality of these containers may be provided for a single reactor, so that one may be filled and/or emptied, while another is in place in the reactor, with the latter in full operation.

After the container is suitably filled, it may be lifted by its hooks 41, using any suitable material conveying hoist means, such as are now common in many industrial plants, and lowered into the reactor. When the container is in a desired position, the downwardly extending ring 42 of the container will be located as indicated in Fig. 3 intermediate a pair of concentric, upwardly extending flanges 49 and 50, which are preferably suitably secured to the member 17, for example, by welding. The space between the flanges 49 and 50 may, if desired, be filled with a suitable gasket-forming material, which may be asbestos or a material having an asbestos base. Alternatively, the flange 42 of the container 38 may rest merely upon the metal of the annular member 17 and substantially prevent gas flow from the plenum chamber except through the container 38.

Once the container is in position in the reactor, the top member 19 may be moved to its operative position on top of the reactor as shown in Fig. 3, for example, by the use of lifting lugs shown at 51, which correspond in construction and function to the hooks 41 provided on the container 38. The top member 19 is located in a predetermined angular position with respect to the stationary portion of the reactor by cooperation between the members 26 and 27 shown in Figs. 1 and 2. The swing bolts may then be swung up to their operative positions and the nuts or wheels 28 tightened to secure the top member 19 in position on the reactor. The device is now in readiness for actual operation.

During the operation gases, which are usually highly heated, are brought into the reactor through the duct 32, and thence pass through the plenum chamber 15. From this chamber the gases flow upwardly through the gas-pervious bottom of the container 38 and thence through the charge, passing more or less radially outwardly after they emerge from the container and thence down between the side of the container 38 and the inside of the reaction chamber 13 to pass through the apertures 36 into the exhaust manifold 33. The gases then flow from the exhaust manifold through the duct 37 to suitable treating apparatus (not shown) from which a portion of the gases after treatment may be augmented as desired and then recycled through the device.

While there is herein shown and described but one principal form of the present invention, and certain alternatives of construction have been indicated as the description proceeded, other variants will be apparent to those skilled in the art from the foregoing description. We do not wish to be limited, therefore, except by the scope of the appended claims, which are to be construed validly as broadly as the state of the prior art permits.

What is claimed is:

1. A reactor for the high temperature reduction of iron oxide and the like, comprising stationary means providing bottom and side walls forming a central reaction chamber and a contiguous plenum chamber below said reaction chamber, a removable container having a gas-pervious bottom and substantially gas-impervious side portions of good heat conducting characteristics for holding a charge of solid material to be treated in the reactor by a gas-to-solid treatment, said container having transverse dimensions substantially less than those of said reaction chamber to provide an annular space therebetween when said container is positioned in said reaction chamber, means supported by said stationary means for supporting said container in said reaction chamber and for blocking egress of gases from said plenum chamber to said reaction chamber except through said container, a removable insulated top member for said reaction chamber arranged to seat in a gas-tight manner on the upper portion of said side walls, means for securing said top member to said stationary means, so as to seal the upper end of said reaction chamber, passage means extending through one of said side walls into said plenum chamber for supplying hot gases thereto, an annular manifold disposed in and extending around the lower portion of said reaction chamber at a level below the top of said container when it is in said reaction chamber, a plurality of apertures opening from the interior of said reaction chamber into said manifold and disposed substantially uniformly therearound, and passage means extending from said manifold through one of said side walls for the removal of gases from said reaction chamber through said apertures and said manifold, whereby gases must pass from said plenum chamber, solely through said container and in contact with the contents thereof, thence downwardly in the annular space between the side portions of said container and the side walls of said reaction chamber to said apertures into said manifold, so as to keep the contents of said reaction chamber within a limited range of temperatures and to minimize temperature differences in various parts thereof.

2. A reactor in accordance with claim 1, in which said top member comprises a gas-impervious metallic structure, in which said side walls include a metallic ring having a non-metallic gasket element associated therewith against which a portion of said top member is adapted to be held during the operation of the reactor, and in which said means for securing said top member to said stationary means comprise a plurality of swing bolts and cooperating lug means around the periphery of said top member.

3. A reactor in accordance with claim 1, in which said means for blocking egress of gases from said plenum chamber to said reaction chamber except through said container, comprise a substantially concentric pair of upstanding angular flanges arranged on an annular ledge at the bottom of said reaction chamber surrounding said plenum chamber, and a downwardly extending annular flange formed on said container and adapted to be disposed between said substantially concentric annular flanges when said container is positioned within said reaction chamber.

References Cited in the file of this patent

UNITED STATES PATENTS

| | | |
|---|---|---|
| 1,518,043 | Audianne et al. | Dec. 2, 1924 |
| 1,751,581 | Gould | Mar. 25, 1930 |
| 1,978,518 | Wetherbee | Oct. 30, 1934 |
| 2,578,193 | Marshall | Dec. 11, 1951 |